(12) United States Patent
Sohlman et al.

(10) Patent No.: US 9,205,503 B2
(45) Date of Patent: Dec. 8, 2015

(54) SAW CHAIN DEPTH GAUGE FILING TEMPLATE

(75) Inventors: Henrik Sohlman, Skogås (SE); Rashid Gawad, St. Lucia (AU); Christian Liliegård, Jönköping (SE); Per Carlbäck, Gränna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/408,434

(22) PCT Filed: Jul. 5, 2012

(86) PCT No.: PCT/EP2012/063165
§ 371 (c)(1),
(2), (4) Date: Dec. 16, 2014

(87) PCT Pub. No.: WO2014/005641
PCT Pub. Date: Jan. 9, 2014

(65) Prior Publication Data
US 2015/0113818 A1  Apr. 30, 2015

(51) Int. Cl.
*B23D 63/16* (2006.01)

(52) U.S. Cl.
CPC .................... *B23D 63/162* (2013.01)

(58) Field of Classification Search
CPC ...... B23D 63/10; B23D 63/16; B23D 63/162; B23D 63/18; B23Q 17/0942
USPC .................... 33/201, 202, 562, 628
See application file for complete search history.

(56) References Cited

U.S. PATENT DOCUMENTS

| | | | | |
|---|---|---|---|---|
| 1,571,397 A | * | 2/1926 | Dougan | 33/202 |
| 1,661,081 A | * | 2/1928 | Nemeth | 33/202 |
| 2,622,338 A | | 12/1952 | Cox | |
| 3,365,805 A | | 1/1968 | Carlton | |
| 4,325,168 A | * | 4/1982 | Swentzel | 76/80.5 |
| 4,404,872 A | * | 9/1983 | Fritz | 76/80.5 |
| 4,412,463 A | | 11/1983 | Beerens | |
| RE31,504 E | * | 1/1984 | Aksamit | 76/80.5 |

(Continued)

OTHER PUBLICATIONS

"Sharpening a Chainsaw", printed on Aug. 4, 2011 from http://www.permies.com/permaculture-forums/6557_0/woodland-care/sharpening-a-chainsaw.

(Continued)

*Primary Examiner* — G. Bradley Bennett
(74) *Attorney, Agent, or Firm* — Nelson Mullins Riley & Scarborough LLP

(57) ABSTRACT

The invention relates to a saw chain depth gauge filing template (1), comprising a first flat section (2) and a second flat section (3), wherein both sections (2, 3) are made from a single piece of flat metal, especially from sheet metal, wherein the first flat section (2) has a first bearing surface (4) for a cutter link edge (5) of a saw chain (6) to be filed, wherein the second flat section (3) has second bearing surfaces (7) for a drive link (8) of the saw chain (6), wherein the second surfaces (7) are established by an linear edge (9) in which at least two incisions (10, 11; 10, 11) are machined, wherein the second flat section (3) has at least one cutout (12, 12) for a part of the saw chain (6) to be sharpened by filing. Furthermore, the invention relates to a method for sharpening a saw chain by using such a saw chain depth gauge filing template. By the proposed concept filing of a saw chain becomes possible in a more precise way.

12 Claims, 3 Drawing Sheets

(56) References Cited

U.S. PATENT DOCUMENTS

| | | | |
|---|---|---|---|
| 4,473,958 A | | 10/1984 | Atkinson |
| 4,587,868 A | * | 5/1986 | Kuwica ............................. 76/36 |
| 4,727,776 A | * | 3/1988 | Granberg ....................... 76/80.5 |
| 4,738,165 A | | 4/1988 | Gelman |
| 4,745,827 A | * | 5/1988 | Kuwica ............................. 76/36 |
| 5,241,882 A | | 9/1993 | Eriksson |
| 6,817,111 B1 | * | 11/2004 | Corrado .......................... 33/628 |
| 2015/0086281 A1 | * | 3/2015 | Ottosson .................... 407/29.15 |

OTHER PUBLICATIONS

International Search Report and Written Opinion of PCT/EP2012/063165 mailed Mar. 5, 2013.

Chapter II International Preliminary Report on Patentability of PCT/EP2012/063165 mailed Jun. 26, 2014.

* cited by examiner

FIG 1 (STATE OF THE ART)
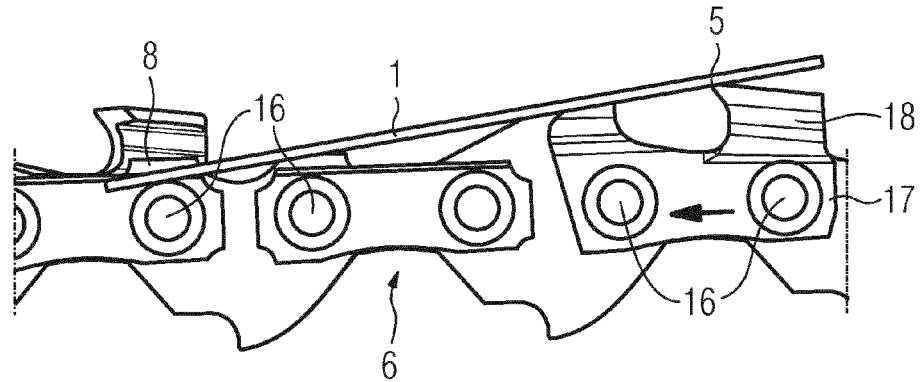
FIG 2
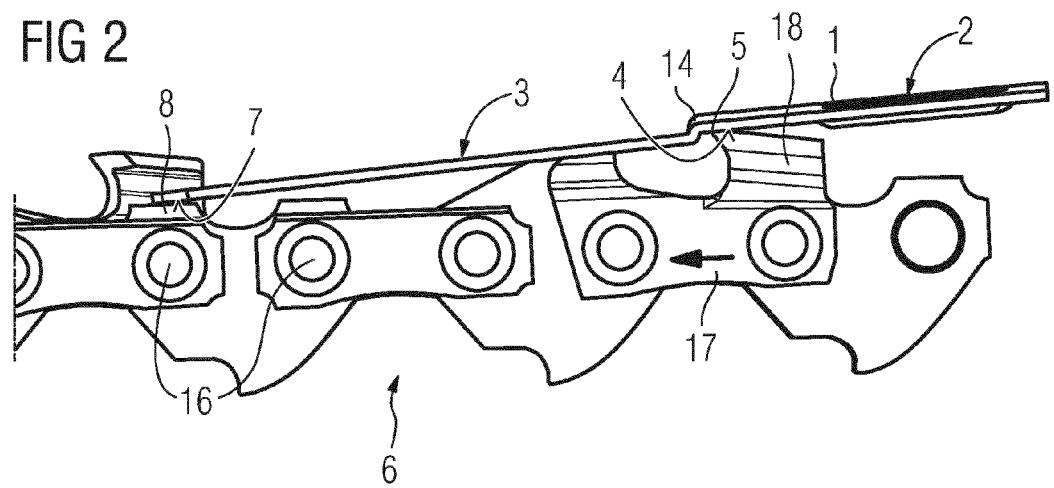
FIG 3
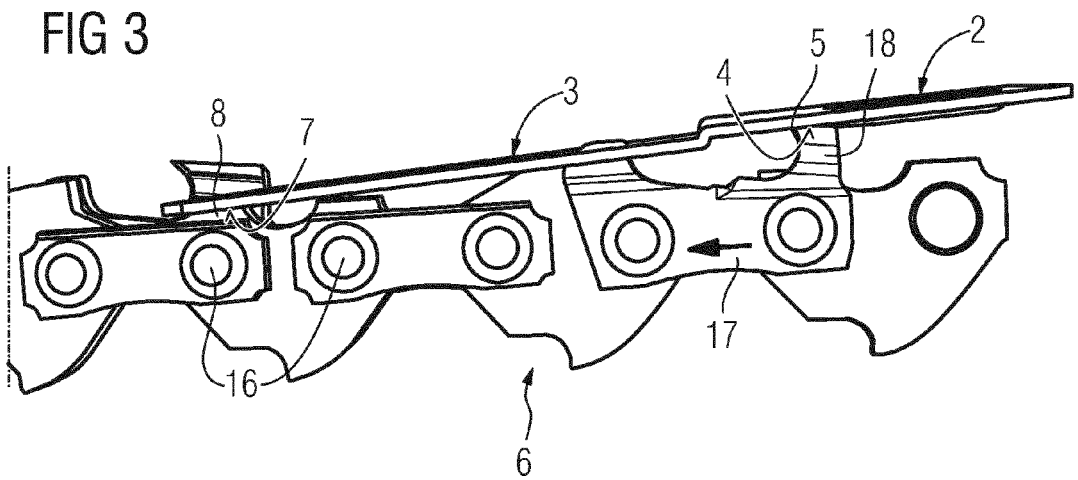

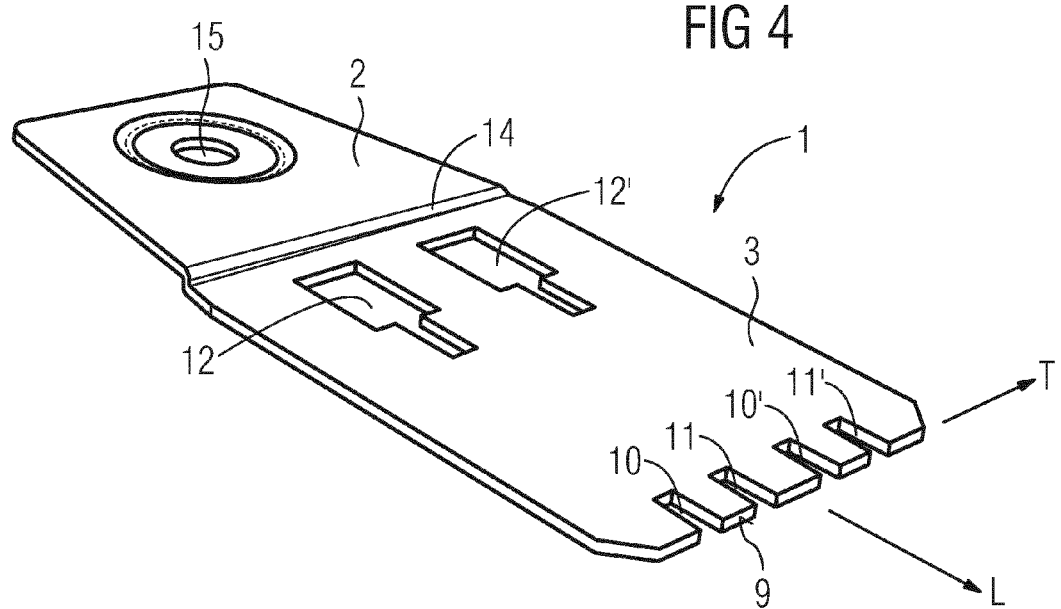
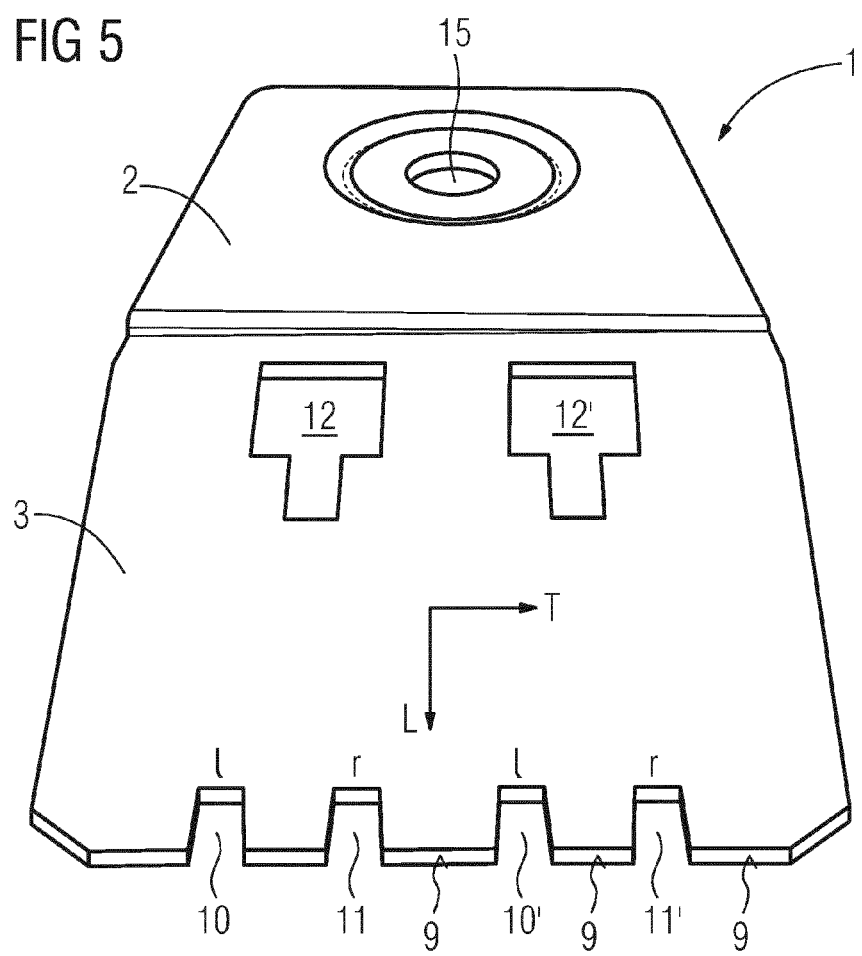

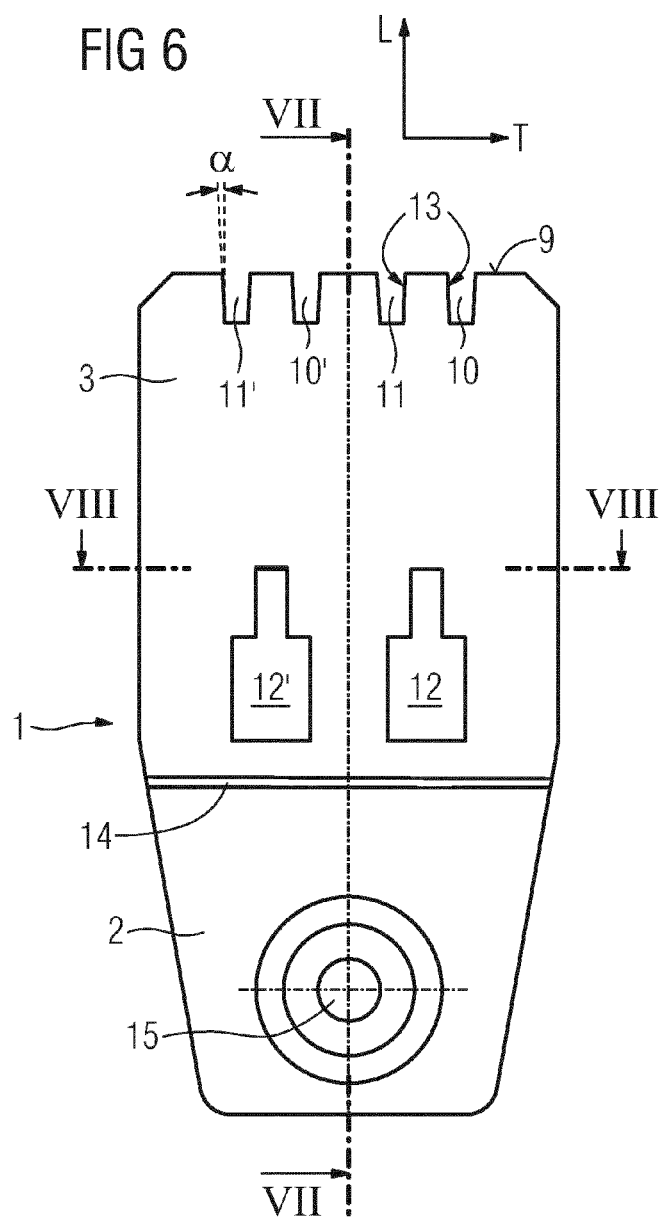
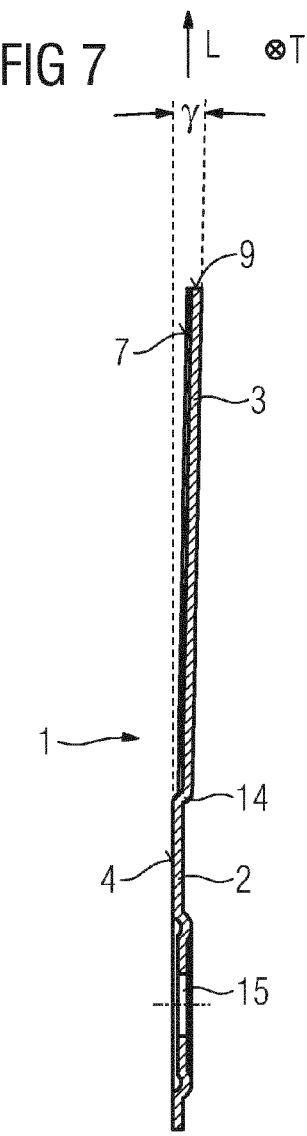
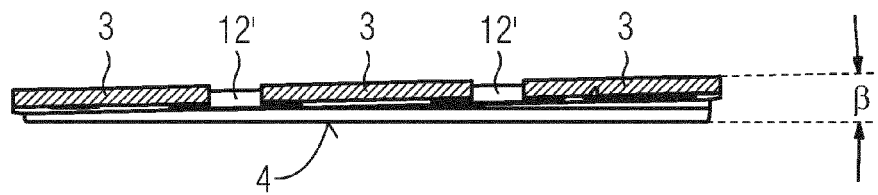

SAW CHAIN DEPTH GAUGE FILING TEMPLATE

The invention relates to a saw chain depth gauge filing template.

In FIG. 1 an example of a pre-known saw chain depth gauge filing template is shown. Here, a saw chain 6 has a plurality of cutter links 17 and of drive links 8, wherein the different chain parts are connect by means of rivets; the rivet heads are denoted with 16. To sharpen the saw chain 6 a saw chain depth gauge filing template 1 is placed onto the saw chain 6 as shown in the figure. That is, the gauge filing template 1 rests on the cutter edge 5 at a rear end and on the rivet heads 16 with a front end.

A saw chain depth gauge filing template of this kind is know e. g. from U.S. Pat. No. 4,738,165 A. Such a depth gauge filing template can be a part of a chain filing gauge. Other comparable solutions are disclosed in U.S. Pat. No. 5,241,882, in U.S. Pat. No. 4,473,958, in U.S. Pat. No. 4,412,463, in U.S. Pat. No. 3,365,805 and in U.S. Pat. No. 2,622,338.

It is a certain problem and difficult to place and hold the depth gauge filing template in the correct position during use, i. e. during the filing operation to sharpen the respective parts of the saw chain. Specifically, it is difficult to locate the template at the correct angle and position on the chain so that less than optimal filing results of the chain's depth gauge are obtained and thus no optimal cutting performance of the saw.

The pre-known gauge filing templates do not compensate sufficiently the angel changes, i. e. the change of the height of the cutter link edge, during the lifetime of the saw chain, which changes from filing event to filing event. This results in a varied depth gauge level during the lifetime of the chain. Consequently, an unefficient cutting performance is caused and in most cases the chain becomes unusable when it approaches the end of its lifetime since the depth gauge level becomes very low (closer to the plate thickness).

Thus, it is an object of the present invention to propose a saw chain depth gauge filing template of the mentioned kind which allows a more precise location on the saw chain during the filing operation, so that the filing can be carried out in such a way that an optimized filing result is obtained from filing event to filing event. Thus, the saw chain should maintain an optimal cutting ability till its end of the lifetime.

The solution of this object according to the invention is characterized in that the saw chain depth gauge filing template comprises a first flat section and a second flat section, wherein both sections are made from a single piece of flat rigid material, particularly metal, preferably sheet metal, wherein the first flat section has a first bearing surface for a cutter link edge of a saw chain to be filed, wherein the second flat section has second bearing surfaces for a drive link of the saw chain, wherein the second surfaces are established by an linear edge in which at least two incisions are machined, wherein the second flat section has at least one cutout for a part of the saw chain to be sharpened by filing.

The at least two incisions have preferably a substantial rectangular shape in a top plan view.

Side walls of the at least two incisions are preferably arranged under a first angle to a longitudinal direction of the filing template; the first angle is preferably between 2° and 10°, specifically between 3° and 5°.

The gauge filing template can have a longitudinal direction, wherein the second flat section is then preferably arranged in longitudinal direction under a second angel relatively to the first flat section; the second angle is preferably in the range between 0.5° and 2°.

The depth gauge filing template can furthermore have a transversal direction which is perpendicular to the longitudinal direction, wherein the second flat section is arranged in transversal direction under a third angel relatively to the first flat section; the third angel is in the range between 0.5° and 10°.

Thus, the first and the second flat sections can be inclined relative to another in two directions which allows a better and more precise filing process and thus an improved performance of the saw chain.

Preferably, four incisions are machined in the linear edge of the second flat section. The linear edge is preferably perpendicular to the longitudinal direction in a top plan view onto the filing template. The four incisions can be arranged parallel to another along the transversal direction.

Preferably, a bending edge is arranged between the first flat section and second flat section. This bending edge forms preferably a step in a direction perpendicular on the first flat section and the second flat section respectively. By this measure the stability of the template is significant improved.

Two cutouts can be arranged in the second flat section.

Furthermore, a circular bore can be arranged in the first flat section. This bore might be use to pivotally link the depth gauge filing template to a filing gauge as for example shown with U.S. Pat. No. 5,241,882 A.

The proposed method for sharpening a saw chain by using of a saw chain depth gauge filing template as described above is characterized in that the saw chain depth gauge filing template is arranged such that the first flat section contacts a cutter link edge of the saw chain with its first bearing surface and that the second flat section contacts a drive link of the saw chain with its second bearing surfaces; in this position of the template parts of the cutter link which reach through the cutout in the second flat section are filed.

The proposed concept allows maintaining an even depth gauge level on the cutter links after every filing event, i. e. during the whole lifetime of the saw chain. Thus, the proposed solution increases the performance of the saw chain through its lifetime and also prolongs the lifetime by avoiding premature chain scraping due to low depth gauge results after filing.

Furthermore, the stability and the correct positioning of the depth gauge tool on the saw chain are improved. While pre-known depth gauge tools rest on the cutter link edge at the rear end of the template and on the rivet heads on the front end, the proposed concept allows that the template rests on the cutter link edge at the rear end (as pre-known) but rest at the front end on the drive link instead. The dimensions of a drive link can be more accurately controlled during its manufacturing than this is possible with the shape of the rivet head during the assembly of the saw chain. Thus by contacting of the drive link with its second bearing surface makes the positioning of the depth gauge tool more accurate.

Specifically, the combination of the following features leads to a significant improvement of a depth gauge tool (template) which is used with a chainsaw sharpener: The tool (template) is substantial planar and has two flat sections, which are arranged relatively to another in an inclined manner. A bend between the two flat sections enhances the mechanical stability substantially. The depth gauge tool rests on a drive link of the saw chain in the front in the sharpening configuration. Preferably, the depth gauge tool has four narrow slots.

The suggested shape of the depth gauge filing template and more specifically the bending edge between the two flat sections increases the strength of the template and thus improves also the quality of the filing process.

In the drawings an embodiment of the invention is depicted.

FIG. 1 shows a side view of a saw chain on which a saw chain depth gauge filing template according to the state of the art is placed, FIG. 2 shows a side view of a saw chain on which a saw chain depth gauge filing template according to the invention is placed, FIG. 3 shows a similar depiction as FIG. 2, wherein the saw chain is in a further used state, FIG. 4 shows a perspective view of the depth gauge filing template according to FIG. 2, FIG. 5 shows a perspective view according to FIG. 5, seen from another position, FIG. 6 shows a top plan view of the depth gauge filing template according to FIG. 2, FIG. 7 shows the cross section VII-VII according to FIG. 6 and FIG. 8 shows the cross section VIII-VIII according to FIG. 6.

In the FIGS. 2 to 8 a saw chain depth gauge filing template 1 is shown alone and when placed on a saw chain 6.

Basically, the depth gauge filing template 1 is made from a piece of sheet metal which is hardened in a well known manner. The sheet metal forms a first flat section 2 and a second flat section 3. At the transition between the two sections 2, 3 a bending edge 14 is formed and has a form like a step. The mechanical stability of the template 1 is significantly enhanced by this measure.

The first flat section 2 forms a first bearing surface 4 at its bottom side which is designed to be located on a cutter edge 5 of the saw chain 6 (see FIGS. 2 and 3). Likewise, the second flat section 3 forms a second bearing surface 7 at its bottom side; this bearing surface 7 is designed to be located on a drive link 8 of the saw chain 6. Thus, during use the template 1 has no contact with the rivet heads 16 of the saw chain 6.

In FIG. 2 the saw chain 6 is shown in a quite new state when the sharpening of the cutting edges of the saw chain 6 takes place the first time. During the lifetime of the saw chain 6 material is removed by filing. FIG. 3 shows basically the same situation as FIG. 2, but here the saw chain 6 was already used a certain part of its lifetime (thus the length of cutter 18 with cutter link 17 is significantly reduced due to repeated filing action).

The following further features of the template 1 should be mentioned:

The template 1 forms a linear edge 9 at a distal end of the second flat section 3. This linear edge 9 runs perpendicular to a longitudinal direction L of the template 1, i. e. in a transversal direction T.

In the region of the linear edge 9 of the second flat section 3 four incisions 10, 10', 11, 11' are machined (i. e. punched during the production of the template 1). Furthermore, two cutouts 12, 12' are machined (i. e. punched) into the second flat section 3. This allows to use the template 1 flexible for the filing of a saw chain 6.

To easily arrange and remove the template 1 into the position as shown in FIG. 2 and FIG. 3 and away from this position the side walls 13 of the incisions 10, 10', 11, 11' are provided with a slight conical shape, i. e. as can be seen from FIG. 6 a first angle α is provided between the side walls 13 and the longitudinal direction L. The first angle is presently 6°.

Furthermore, the first flat section 2 and the second flat section 3 are pivoted relatively to another in two planes. As can be seen from FIG. 8 a second angle β is provided between the two sections 2, 3 when seen in the cross section VIII-VIII according to FIG. 6. Furthermore, as can be seen from FIG. 7 a third angle γ is provided between the two sections 2, 3 when seen in the cross section VII-VII according to FIG. 6. The second angle β is about 1° in the shown embodiment, the third angle γ is about 2.2°

Thus, to sum up the proposed saw chain depth gauge filing template 1 is used with a chainsaw sharpener. The template 1 has a first planar part 2 and a second planar part 3. A bending edge (bend) 14 is provided between the first and second planar parts 2, 3 for improved strength.

The second planar part 3 includes separate apertures 12, 12' for sharpening depth gauges for hard and soft cutting operations.

Further, the second planar part 3 includes four narrow slots 10, 11, 10', 11', two each for left (see "1" in FIG. 5) and right (see "r" in FIG. 5) cutter links.

Moreover, the second planar part 3 is inclined in two planes relatively to the first planar part 2, namely, longitudinally and laterally, for improved performance.

The first planar part 2 includes a bore (hole) 15 for pivotally connecting the depth gauge template with a filing gauge.

In sharpening configuration, the template rests on a drive link 8 in the front instead of a rivet head 16. This design of the tool improves the accuracy and stability of the depth gauge tool significantly.

REFERENCE NUMERALS

1 Saw chain depth gauge filing template
2 First flat section
3 Second flat section
4 First bearing surface
5 Cutter edge
6 Saw chain
7 Second bearing surface
8 Drive link of the saw chain
9 Linear edge
10 Incision
10' Incision
11 Incision
11' Incision
12 Cutout
12' Cutout
13 Side wall
14 Bending edge
15 Bore
16 Rivet head
17 Cutter link
18 Cutter
α First angle
β Second angle
γ Third angle
L Longitudinal direction
T Transversal direction

The invention claimed is:

1. Saw chain depth gauge filing template, comprising a first flat section and a second flat section, wherein both the first and second flat sections are made from a single piece of flat rigid material, wherein the first flat section has a first bearing surface for a cutter edge of a saw chain to be filed, wherein the second flat section has at least one cutout for a part of the saw chain to be sharpened by filing, wherein the second flat section for a drive link of the saw chain, wherein the second surfaces are established by an linear edge in which at least two incisions are machined, whereas the saw chain depth gauge filing template has a longitudinal direction and a transversal direction that is perpendicular to the longitudinal direction, and wherein the second flat section is arranged under an angle relative to the first flat section, the angle being at least one of a second angle in the longitudinal direction and a third angle in the transversal direction.

2. Saw chain depth gauge filing template according to claim 1, wherein the second angle is in a range between 0.5° and 2°.

3. Saw chain depth gauge filing template according to claim 1, characterized in the third angle is in a range between 0.5° and 10°.

4. Saw chain depth gauge filing template according to claim 1, wherein the at least two incisions have a substantially rectangular shape in a top plan view.

5. Saw chain depth gauge filing template according to claim 1, wherein side walls of the at least two incisions are arranged under a first angle to a longitudinal direction of the filing template.

6. Saw chain depth gauge filing template according to claim 5, wherein the first angle is between 2° and 10°.

7. Saw chain depth gauge filing template according to claim 1, wherein four incisions are machined in the linear edge of the second flat section, wherein the linear edge is substantially perpendicular to the longitudinal direction in a top plan view onto the filing template.

8. Saw chain depth gauge filing template according to claim 7, wherein the four incisions are arranged parallel to another along the transversal direction.

9. Saw chain depth gauge filing template according to claim 1, wherein a bending edge is arranged between the first flat section and the second flat section.

10. Saw chain depth gauge filing template according to claim 9, wherein the bending edge forms a step in a direction perpendicular on the first flat section and the second flat section respectively.

11. Saw chain depth gauge filing template according to claim 1, wherein two cutouts are arranged in the second flat section.

12. Saw chain depth gauge filing template according to claim 1, wherein a circular bore is arranged in the first flat section.

* * * * *

UNITED STATES PATENT AND TRADEMARK OFFICE
CERTIFICATE OF CORRECTION

PATENT NO.        : 9,205,503 B2                                       Page 1 of 1
APPLICATION NO.   : 14/408434
DATED             : December 8, 2015
INVENTOR(S)       : Sohlman et al.

It is certified that error appears in the above-identified patent and that said Letters Patent is hereby corrected as shown below:

In the claims

Column 4, Line 65, Claim 1 "wherein the second flat section for a drive link of the saw" should read -- wherein the second flat section has second bearing surfaces for a drive link of the saw --.

Signed and Sealed this
Twenty-ninth Day of March, 2016

Michelle K. Lee
*Director of the United States Patent and Trademark Office*